United States Patent [19]

Peuzin et al.

[11] 4,086,124
[45] Apr. 25, 1978

[54] METHOD OF POLARIZATION OF A FERROELECTRIC MATERIAL

[75] Inventors: Jean Claude Peuzin, Eybens; Michel Tasson, Seyssinet Pariset, both of France

[73] Assignee: Commissariat a l'Energie Atomique, Paris, France

[21] Appl. No.: 578,678

[22] Filed: May 19, 1975

[30] Foreign Application Priority Data

May 30, 1974 France .................................. 74 18872

[51] Int. Cl.² ............................................. B01J 17/00
[52] U.S. Cl. ................................. 156/603; 156/6.6 A; 29/25.35; 148/121; 252/62.9; 365/117
[58] Field of Search ............... 156/603, 616, 619, 624, 156/DIG. 63, DIG. 71, DIG. 73; 29/585, 25.35; 317/262 F; 312/8.5; 148/121; 340/173.2; 252/62.9

[56] References Cited
FOREIGN PATENT DOCUMENTS
1,397,526    1965    France.

OTHER PUBLICATIONS
Nassau et al., "Ferroelectric Lithium Niobate Growth, Domain Structure, Dislocations and Etching", J. Physics & Chem. Solids, vol. 27, (1966), pp. 983–988.

Primary Examiner—Norman Yudkoff
Attorney, Agent, or Firm—Flynn & Frishauf

[57] ABSTRACT

In a method of polarization of a ferroelectric material having a Curie point at a temperature $T_c$, the material is brought to a temperature above $T_c$, subjected to a temperature gradient and then returned to a temperature below the Curie point. No electric field is applied, because the temperature gradient itself has been found to produce ferroelectric polarization under the described circumstances.

2 Claims, 5 Drawing Figures

METHOD OF POLARIZATION OF A FERROELECTRIC MATERIAL

This invention relates to a method of polarization of a ferroelectric material and finds an application in the formation of polarized ferroelectric crystals which are primarily intended for use in electrooptics and in electroacoustics.

In one known method of manufacture of ferroelectric crystals, recourse is had to the Czochralski drawing technique. The crystal obtained by this method usually has a polydomain structure in that it contains in volume ferroelectric domains which have an antiparallel orientation. In point of fact, the majority of applications call for the use of single-domain crystals, piezoelectric properties in particular being a function of the degree of polarization of the crystal.

In order to polarize a ferroelectric crystal, the following known method is employed. The crystal is cut at right angles to its ferroelectric axis; electrodes are then deposited on the two flat faces of the crystal, for example by means of a platinum lacquer which is annealed at 800° C. The crystal is then placed between two sheets of platinum which serve as electrodes, the assembly thus formed is introduced into a furnace and this latter is heated to a temperature which is higher than the Curie point of the material. For example in the case of lithium niobate which is fabricated from a bath of congruent composition, the Curie point is 1150° C and the melting point is approximately 1260° C. An electric current is then passed through the crystal while its temperature is slowly reduced.

This known method is attended by a large number of disadvantages:

it entails the need to ensure that both crystal faces are cut at right angles to the ferroelectric axis;

the deposition of platinum electrodes makes it necessary to carry out an additional annealing operation;

the electrodes diffuse within the crystal to a slight extent during the annealing operation;

if the platinum sheets are applied directly against the crystal without prior deposition of electrodes on the platinum lacquer, the electric field is not uniform in contact with said sheets and this results in faulty polarization in a layer having a depth of a few millimeters;

certain crystals such as lithium niobate are ionic conductors in the vicinity of the Curie point; the applied electric polarization field produces more or less pronounced decomposition phenomena which are related to the displacement of the ions in the crystal, mainly lithium vacancies in the case of lithium niobate;

thin films cannot be polarized by an electric field; in fact, such films are not usually deposited on a conductive substrate and it is therefore not possible to take the film between two electrodes;

it also proves impossible to polarize thin plates by the electric-field method since the quantity of material lost in contact with the electrodes is too great.

The present invention is precisely directed to a method of polarization of a ferroelectric material which is not subject to any of the disadvantages mentioned above, but resulting in a polarization of ferroelectric materails which is equivalent to that obtained by the electric-field method without the necessity of applying an electric field.

In more exact terms, the method according to the invention for the polarization of a ferroelectric material which exhibits a Curie point at the temperature $T_c$ is distinguished by the fact that said material is brought to a temperature above $T_c$, that a temperature gradient is then applied to said material, whereupon said material is brought back to a temperature below the Curie point. It has been discovered that under these circumstances polarization can be produced by the temperature gradient without any necessity of applying an electric field, by passage of electric current or otherwise.

In a first embodiment, said material is maintained under a temperature gradient during the Curie point transition at the time of return to the temperature below the Curie point.

In accordance with this first embodiment, two alternative modes of operation are possible: in the first mode of operation, the crystal is stationary and the material is initially subjected to a temperature gradient located entirely above $T_c$ and the temperature of the material is then caused to fall below $T_c$ while maintaining said gradient, thus superposing a temporal temperature gradient on the spatial temperature gradient; in the second mode of operation, said material is displaced through a temperature-gradient zone from an upstream zone in which a temperature of higher value than $T_c$ is maintained to a downstream zone in which a temperature of lower value than $T_c$ is maintained.

The rate of decrease in temperature at the time of transition through the Curie point is controlled with strict accuracy. Since orientation of the polarization by means of the temperature gradient takes place only in the vicinity of the Curie point, it is necessary to pass through this latter at a sufficiently low speed.

In a second embodiment, a third alternative to the two alternatives of the first embodiment, the temperature gradient within the material is suppressed, as explained below, just prior to transition through the Curie point at the time of return to a temperature below the Curie point.

In this embodiment, it is preferable to maintain a thermal gradient for a sufficiently long period of time and at a sufficiently high temperature in order to create an ionic displacement which orients the polarization. In this case also, it is necessary to control the rate of decrease in temperature at the time of transition through the Curie point.

Since ion mobility increases with temperature, this embodiment is advantageously applicable to substances which have relatively low Curie points.

In this embodiment, a polydomain ferroelectric crystal is brought to a predetermined temperature which is higher than the Curie point. A thermal gradient is then created at this temperature for a predetermined period of time. The temperature is then reduced under thermal gradient to the vicinity of the Curie point. The temperature gradient is then suppressed (that is, the temperature of the crystal is made homogeneous) and the Curie point is thereafter finally passed at a controlled speed.

The properties and advantages of the invention will in any case become more readily apparent from the following description of examples which are given by way of explanation without any limitation being implied, reference being made to the accompanying drawings, wherein.

Figure 1:
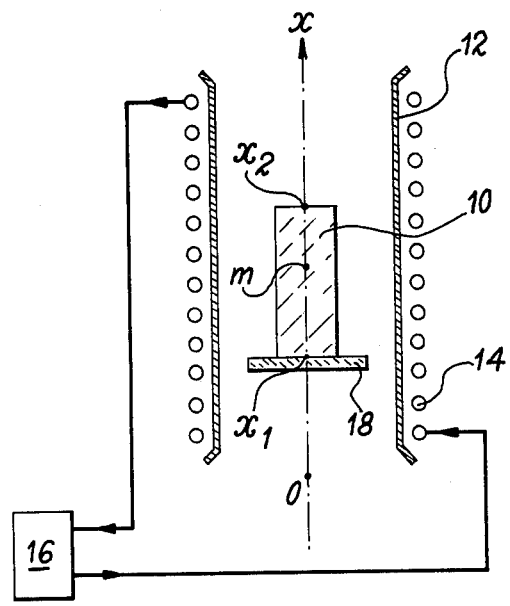
FIG. 1 illustrates the first alternative mode of operation in which the crystal is stationary and the temperature gradient is displaced towards the temperatures below the Curie point.

As shown in FIG. 1, the crystal 10 to be polarized is placed within a furnace 12 provided with heating means 14 which are supplied from a suitable current source 16. The crystal 10 is placed on a stationary support 18. The position of the crystal 10 within a furnace is located with respect to an axis Ox. The abscissae of the extremities of the crystal rod are designated as $x_1$ and $x_2$; any given point in the rod has the abscissa $m$.

Figure 2:
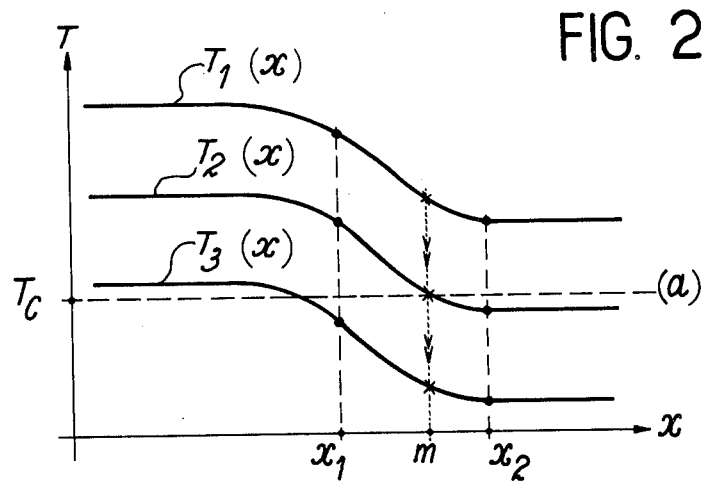
FIG. 2 is an explanatory diagram of this alternative mode of operation.
Figure 3:
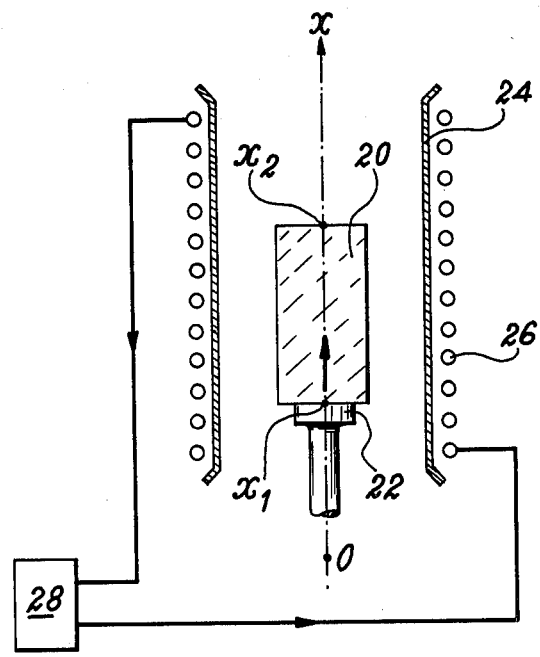
FIG. 3 illustrates the second alternative mode of operation in which the temperature gradient is permanent and in which the crystal is displaced from a zone at a temperature which is higher than $T_c$ to a zone at a temperature which is lower than $T_c$.

The heating means 14 are such that a thermal gradient is established within the furnace in accordance with the variations shon in FIG. 2. Initially, the law of variation of the temperature T as a function of the abscissa $x$ on the axis Ox is represented by the curve $T_1(x)$. All the points of this curve are located above the ordinate corresponding to the Curie temperature $T_c$ of the material 10. Under these conditions, the initial temperature throughout the entire crystal is higher than the Curie point.

The general temperature of the furnace is then slowly reduced, for example by acting on the supply 16 so as to maintain the thermal gradient. This decrease in temperature takes place until the obtainment of a temperature distribution of the type represented by the curve $T_3(x)$. This curve is such that the temperature is below the Curie point in every part of the crystal 10 which is located between the abscissae $x_1$ and $x_2$.

In consequence, the temperature at any point of the rod having an abscissa $m$ must necessarily pass through the value of the Curie point $T_c$; this occurs when the curve representing the variations in the temperature of the furnace as a function of the abscissa is the curve $T_2(x)$ located between the end curves $T_1(x)$ and $T_3(x)$.

Figure 4:
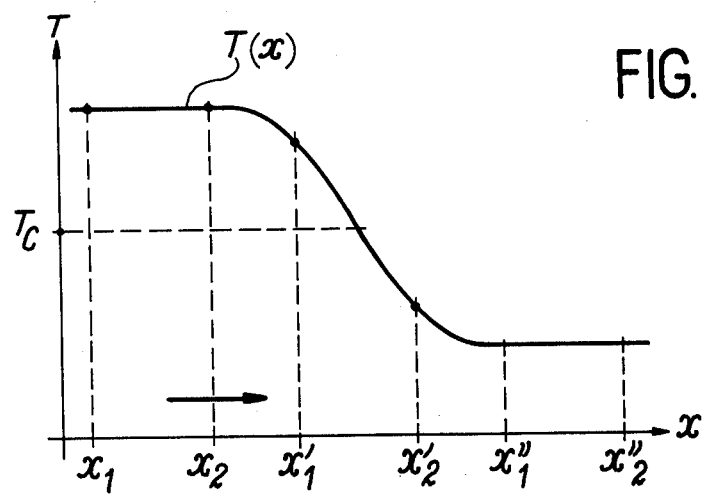
FIG. 4 is an explanatory diagram of this alternative mode of operation.

In the second alternative mode of operation of the method according to the invention, the crystal 20 is placed on a moving support 22 within a furnace 24 provided with heating means 26 supplied from a suitable current source 28. The heating means are so designed as to ensure that a continuous thermal gradient appears within the furnace as illustrated in Fig. 4 in which is shown a curve T $(x)$ representing the temperature variations as a function of the abscissa on an axis Ox, the maximum temperature being higher than $T_c$ and the minimum temperature being lower than $T_c$.

In this second alternative mode of operation, the temperature distribution remains the same but the crystal is displaced from the upstream zone $(x_1, x_2)$ in which the temperature is higher than $T_c$ towards the downstream zone $(x''_1, x''_2)$ in which said temperature is lower than $T_c$. As in the first mode of operation, the temperature at any point of the crystal therefore passes progressively from a temperature above $T_c$ to a temperature below $T_c$ while a temperature gradient is being maintained in the crystal.

Figure 5:
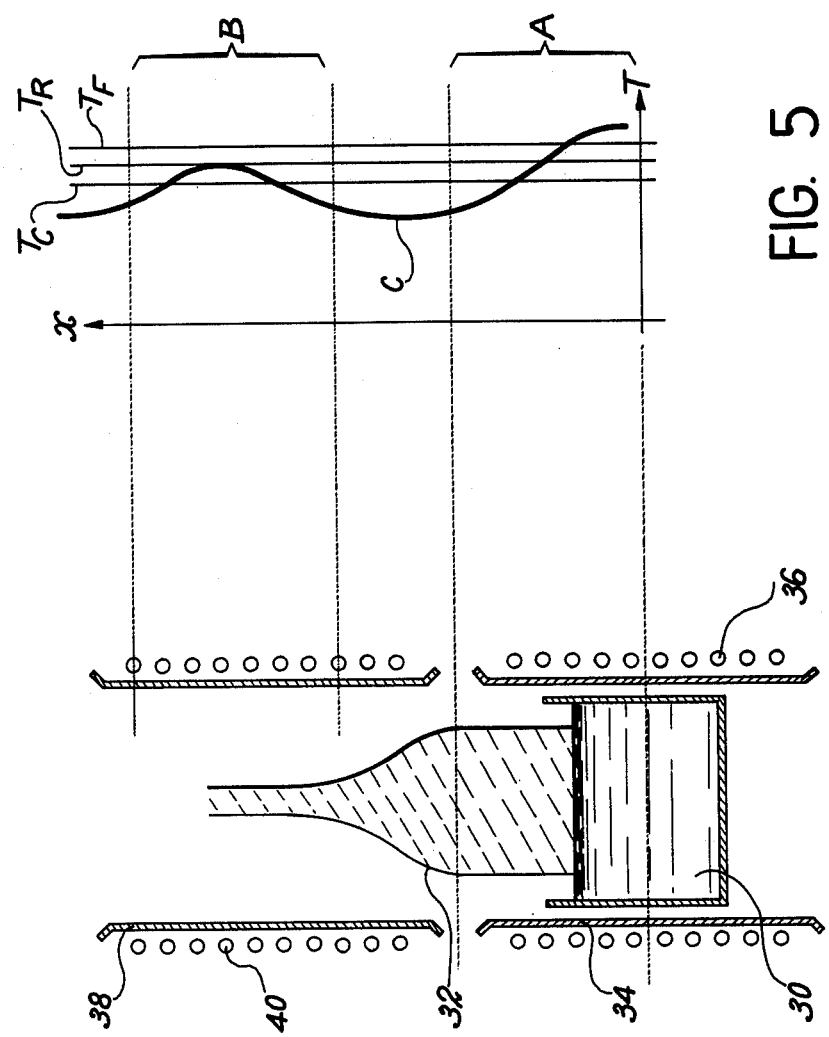
FIG. 5 illustrates the case in which the material is a crystal which has become polarized during the drawing process.

This second alternative mode of operation has an advantage over the first in that it can be very usefully associated with the known method of drawing of crystals along the ferroelectric axis as shown in FIG. 5. There is shown in the left-hand portion of this figure a drawing zone A comprising a bath 30 from which a crystal 32 is drawn. The temperature of said zone A is maintained at a suitable value by means of a furnace 34 provided with heating means 36. The crystal thus drawn then reaches an annealing zone B in which is maintained a thermal gradient produced by a furnace 38 provided with heating means 40. This accordingly produces a temperature transition from a value above $T_c$ to a value below $T_c$ as shown in the right-hand portion of FIG. 5 in which the temperature T is plotted as abscissae. Curve C represents the curve of temperatures of the crystal 32 within the furnaces 34 and 38 which are placed inside a commmon enclosure whilst the straight lines $T_c$, $T_R$ and $T_F$ are the isothermals of the Curie points, of annealing and of melting of the crystal considered. In accordance with this method, the crystal obtained in the case of drawing along the ferroelectric axis is accordingly polarized directly at the outlet of the apparatus.

When no provision is made for the possibility of placing an annealing furnace within the same enclosure so as to produce polarization immediately after drawing, the operation can be performed as follows in order to avoid complete cooling of the furnace and handling of the crystal. In a first step, crystal growth is carried out by drawing. Then, in a second step, the crystal is lowered again into the drawing furnace and subjected to annealing above the Curie temperature, whereupon said crystal is subjected to a suitable thermal gradient while being moved slowly upwards.

By way of explanation, the method which has just been described can be employed for the purpose of polarizing a lithium niobate crystal having a diameter of 30 mm and a length of 20 mm by means of a thermal gradient of 30° C/cm, the rate of transition through the Curie point being 200° C/hr. This rate of transition can be obtained either by reducing the temperature of the furnace or by slow displacement of the crystal at approximately 6 cm/hr.

In a third alternative mode of operation of the method of the invention, a lithium niobate crystal having a thickness of 1 cm along the ferroelectric axis C is heated to 15° C above the Curie point (1150° C). A thermal gradient of 10° C/cm is applied along the axis C for a period of one hour. The thermal gradient is suppressed by equalizing (homogenizing) the crystal temperature and the temperature is thereafter decreased at a rate of 300° C/hour.

The crystals formed in accordance with the invention have physical properties which are identical with those of crystals prepared by the method of polarization which utilizes an electric field. The method according to the invention nevertheless offers a large number of advantages and among these can be mentioned the following:

in the case of crystals drawn along the ferroelectric axis C, polarization can take place without preliminary cutting;

polarization can take place directly within the drawing machine (as shown in FIG. 5) when drawing along the axis C;

there is no electrode in the method according to the invention and therefore no loss of material in contact with said electrodes;

the thermal gradient gives rise to ionic displacement phenomena of much lower magnitude than in the case of application of an electric field. This can be clearly demonstrated by studying the relaxation times of the composition gradients thus created. In fact, when annealing takes place above the Curie point, there is formed a gradient of vacancies of lithium or of displaced ions which interacts with the polarization; this parasitic phenomenon disappears much faster in the case of polarization carried out by means of a thermal gradient in accordance with the invention than in the case of polarization performed by means of an electric field; this indicates that the displacements are much smaller; they are in fact smaller by a factor of 10;

polarized thin films of lithium niobate can be obtained by means of the method according to the invention;

lithium niobate plates can be polarized after cutting by means of the thermal gradient method.

What we claim is:

1. A method of polarizing a ferroelectric material which exhibits a Curie point at a temperature $T_c$, without applying an electric field thereto, comprising:

bringing a solid body of said material to a temperature above the Curie point $T_c$ but below the temperature of fusion;

establishing and maintaining a temperature gradient in said material along a linear dimension of said body without bringing any part of said material to the temperature of fusion;

suppressing said temperature gradient by equalizing the temperature of the heated material as preparation for and prior to transition back through the Curie point $T_c$, and;

bringing said material back to a temperature below the Curie point $T_c$.

2. A method according to claim 1, wherein said material is a lithium niobate crystal.

* * * * *